United States Patent
Brandstein et al.

(10) Patent No.: US 9,441,125 B2
(45) Date of Patent: Sep. 13, 2016

(54) PHOTO-CURABLE INK COMPOSITION

(71) Applicant: Hewlett-Packard Industrial Printing LTD, Netanya (IL)

(72) Inventors: Or Brandstein, San Diego, CA (US); Nataly Lisitsin, Holon (IL); Malan Calitz, Tel Aviv (IL); Alex Trubnikov, Petach Tiqwa (IL); Eytan Cohen, Raanana (IL)

(73) Assignee: Hewlett-Packard Industrial Printing LTD., Netanya (IL)

( * ) Notice: Subject to any disclaimer, the term of this patent is extended or adjusted under 35 U.S.C. 154(b) by 0 days.

(21) Appl. No.: 14/424,655

(22) PCT Filed: Aug. 29, 2013

(86) PCT No.: PCT/IB2013/058114
§ 371 (c)(1),
(2) Date: Feb. 27, 2015

(87) PCT Pub. No.: WO2014/033657
PCT Pub. Date: Mar. 6, 2014

(65) Prior Publication Data
US 2015/0203697 A1     Jul. 23, 2015

(30) Foreign Application Priority Data

Aug. 31, 2012  (EP) .................................... 12182588

(51) Int. Cl.
*C09D 11/30* (2014.01)
*C09D 11/101* (2014.01)
*C09D 11/322* (2014.01)
*B41J 11/00* (2006.01)

(52) U.S. Cl.
CPC ............. *C09D 11/30* (2013.01); *C09D 11/101* (2013.01); *C09D 11/322* (2013.01); *B41J 11/002* (2013.01)

(58) Field of Classification Search
None
See application file for complete search history.

(56) References Cited

U.S. PATENT DOCUMENTS

| | | |
|---|---|---|
| 5,854,300 A | 12/1998 | Gould et al. |
| 6,294,592 B1 * | 9/2001 | Herrmann ............ B41M 5/0023 106/31.6 |
| 6,534,128 B1 | 3/2003 | Carlson et al. |
| 7,977,398 B2 | 7/2011 | Cornell et al. |
| 8,124,671 B2 | 2/2012 | Takabayashi |
| 2002/0198289 A1 | 12/2002 | Gummeson |
| 2004/0091645 A1 | 5/2004 | Heederik et al. |
| 2004/0209976 A1 * | 10/2004 | Nakhmanovich .... C09D 11/101 523/160 |
| 2008/0316244 A1 | 12/2008 | Lugassi et al. |

FOREIGN PATENT DOCUMENTS

| | | |
|---|---|---|
| CN | 102250508 | 11/2011 |
| CN | 102295859 | 12/2011 |
| EP | 1036831 | 9/2000 |
| EP | 1469049 | 10/2004 |
| EP | 2233540 | 9/2010 |
| GB | 2256874 | 12/1992 |
| IN | 201100869 I3 | 3/2012 |
| JP | 2000336295 | 12/2000 |
| JP | 2008531779 | 8/2008 |
| JP | 2011208088 | 10/2011 |
| JP | 2012149228 | 8/2012 |

* cited by examiner

*Primary Examiner* — An Do
*Assistant Examiner* — Renee I Wilson
(74) *Attorney, Agent, or Firm* — HP Inc. Patent Department

(57) ABSTRACT

A photo-curable ink composition including UV curable polyurethane dispersions, water, photo-initiator, colorant and hydrophobic radiation-curable monomers. Also disclosed herein is a method for forming a printed article and an inkjet printing system using said photo-curable ink composition.

14 Claims, No Drawings

PHOTO-CURABLE INK COMPOSITION

BACKGROUND

Inkjet technology has expanded its application to high-speed, commercial and industrial printing, in addition to home and office usage, because of its ability to produce economical, high quality, multi-colored prints. This technology is a non-impact printing method in which an electronic signal controls and directs droplets or a stream of ink that can be deposited on a wide variety of substrates. Inks used in such technologies can be liquid dispersions, solution, or emulsions and can include oil-based inks, non-aqueous solvent based inks, water-based inks and solid inks. Current inkjet printing technology involves forcing the ink drops through small nozzles by thermal ejection, piezoelectric pressure or oscillation, onto the surface of a media. The deposited ink droplets are, then, dried, e.g., using heat or forced air, or allowed to dry at ambient conditions.

Recently, curing of ink by radiation and, in particular, ultraviolet (UV) curing, has become popular. In these cases, special ink is used and the image is cured by exposure to a radiation source. The uses of such radiation-curable (or photo-curable) inks and the curing process are rapidly becoming an alternative to the established conventional drying process.

The inkjet printing industry uses different types of recording fluids such as oil-based inks, solvent-based (non-aqueous) inks, water-based inks, and solid inks (which are melted in preparation for dispensing). Solvent-based inks are fast drying, and as a result, are widely used for industrial printing. When solvent-based inks containing binders and other ingredients are jetted onto a substrate, the solvent(s) partially or fully evaporate from the ink, leaving the binder and other ingredients such as pigment particles on the printed substrate in the form of a dry film. During the drying process, the solvents, which are often volatile organic compounds (VOC), emit vapors, and therefore, can pollute the environment. The pollution problem becomes more critical for higher printing speeds or for wide format images, where large amounts of ink are deposited onto a substrate.

As a result of this and other concerns, efforts related to preparing inks that are environmentally friendly have moved some research in the direction of water-based inks. However, radiation-curable (or photo-curable) water-based ink compositions are noticeably limited among available options due to their specific features. Accordingly, investigations continue into developing radiation-curable water-based ink compositions that exhibit, when printed, specific and excellent printing properties such as, for example, jetting properties as well as improved adhesion.

DETAILED DESCRIPTION

Before particular embodiments of the present disclosure are disclosed and described, it is to be understood that the present disclosure is not limited to the particular process and materials disclosed herein. It is also to be understood that the terminology used herein is used for describing particular embodiments only and is not intended to be limiting, as the scope of protection will be defined by the claims and equivalents thereof. In describing and claiming the composition and method, the following terminology will be used: the singular forms "a", "an", and "the" include plural referents unless the context clearly dictates otherwise. Thus, for example, reference to "a pigment" includes reference to one or more of such materials. Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For examples, a weight range of about 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc. All percent are by weight (wt %) unless otherwise indicated.

The present disclosure refers to a photo-curable ink composition containing colorant, water, photo-initiator, UV curable polyurethane and hydrophobic radiation-curable monomers.

Also disclosed is a method for forming a printed article with said water-based photo-curable ink composition and an inkjet printing system including said ink composition. The present disclosure refers also to a method for preparing a photo-curable ink composition containing a UV curable polyurethane dispersions, water, photo-initiator, colorant and hydrophobic radiation-curable monomers.

The photo-curable ink composition as described herein can be printed in a broad selection of substrates including untreated plastics, flexible as well as rigid, porous substrates such as paper, cardboard, foam board and textile and has a good adhesion on said variety of substrates. The photo-curable ink composition has a good viscosity that enables good printing performances and enables the ability to formulate inks suitable for inkjet application. The photo-curable ink composition of the present disclosure enables thus high printing speed and is very well suited for a use in digital inkjet printing.

When printed on a substrate and cured, said ink composition has improved adhesion to non-polar surfaces. The composition possesses also good scratch resistance and weatherability. It can support high curing speed and has a viscosity enabling good jetting properties. Therefore, the water-based photo-curable ink composition allows reliable jetting, fast drying and curing, ability to print on various media substrates while having excellent image quality and adhesion.

The ink composition is photo-curable (or UV-curable or radiation-curable) ink composition. Said composition is a jettable ink composition meaning thus that the ink can be used with inkjet printing device. The term "curing", in the context of the present disclosure, refers to a process of converting a liquid, such as ink, into a solid by exposure to actinic radiation such as photo-radiation, e.g., ultraviolet (UV) radiation. In the uncured state, ink compositions have a low viscosity and are readily jetted. However, upon exposure to suitable source of curing energy, for example ultraviolet (UV) light, electrons beam energy, and/or the like, there is a formation of a cross-linked polymer network. Such ink compositions are commonly referred to as "energy-curable" inks to distinguish them from "solvent-based" inks.

The ink composition is a water-based photo-curable ink composition, meaning thus that it contains a certain amount of water as solvent. The amount of water in the ink composition is dependent, for example, on the amount of other components of the ink composition. The amount of water in the ink composition includes the amount of water added plus the amount of water in the suspensions and other components of the ink composition. In some examples, the amount of water in the ink composition is in the range of about 10 to about 90 wt % by total weight of the ink composition, in some other example; in the range of about 20 to about 80 wt % by total weight of the ink composition and, in yet some other example, in the range of about 30 to about 70 wt %.

In some examples, the ink composition has a viscosity, at 25° C., of not greater than about 70 cps (centipoises); of not greater than about 50 cps, or, of not greater than about 30 cps. In some other examples, the viscosity of the ink composition is ranging from about 2 cps to about 20 cps at a jetting temperature of about 20° C. to about 55° C. The ink composition can have a static surface tension, at 25° C., of not greater than about 40 dynes/cm or ranging from about 20 cps to about 40 dynes/cm.

UV Curable Polyurethane Dispersion

The ink composition according to the present disclosure includes UV curable polyurethane dispersion, i.e. UV-PUD. As polyurethane dispersion, it is meant herein polyurethane particles that are dispersed in the liquid vehicle. Without being linked by any theory, it is believed that such UV curable polyurethane dispersions provide improved ink film properties to the media on which the ink is applied. Such films, formed by the drying and cross-linking of UV-PUD, are glossy and hard yet flexible.

In some examples, polyurethane dispersions (PUD) are stable dispersions, in water, of polyurethane polymer particles whose size ranges from about 20 to about 200 nm. The polyurethane dispersions can have a Mw in the range of about 1,000 to 100,000 or in the range of about 5,000 to about 50,000. Polyurethane polymer particles can be present in an amount representing from about 1 wt % to about 25 wt %, or from about 5 wt % to about 20 wt % by total weight of the ink composition in some examples.

Polyurethane polymer particles can have a core-shell structure with a branched inner core structure, wherein the core includes an amine cross-linker in an amount of about 0.1 wt % to about 1 wt % and wherein the shell includes a polyol cross-linker in an amount of about 0.5 wt % to about 2 wt %.

The branched inner core structure can be provided by a branched diisocyanate which can be a cyclic diisocyanate. The branched inner core structure can also be provided by a branched diol or a cyclic diol. Polyurethane particles may further contain polymerized monomers including a polyol, a branched diisocyanate, and an acid polyol. Polyurethane polymer particles can include a hard segment (including a diisocyanate) and a soft segment and can also include a chain extender. A chain extender can be any compound capable of polymerizing with the diisocyanate such that the chain extender resides in the hard segment of the polyurethane.

Polyurethane polymer particles include various polyols that can be present as a diol polymerized within a hard segment of the polyurethane particle. In some examples, the polyol can be a diol selected from the group of: cyclic diols; 1,3-cyclohexanedimethanol; 1,4-cyclohexanedimethanol; aliphatic polycarbonate diols; polyether diols; polyethylene glycol; polypropylene glycol; polytetramethylene glycol; poly(ethylene oxide) polymers; poly(propylene oxide) polymers; poly(tetramethylene oxide) polymers; copolymers thereof having terminal hydroxyl groups derived from polyhydric compounds including diols; and combinations thereof. In one aspect, the diol can be cyclic diol. In another aspect, the diol can be an aliphatic cyclic diol. In still another aspect, the diol can be 1,4-cyclohexanedimethanol. The diisocyanates can be selected from the group of cycloaliphatic diisocyanates, bis(4-isocyanotocyclohexyl) methane, methylene diphenyl diisocyanate, hexamethylene diisocyanate, p-tetramethyl xylene diisocyanate, m-tetramethyl xylene diisocyanate, bitolylene diisocyanate, toluene diisocyanate, methylene-bis(4-cyclohexyl)diisocyanate, p-phenylene diisocyanate, isophorone diisocyanate, 1,5-naphthalene diisocyanate, and mixtures thereof. In one aspect, the diisocyanate can be a cycloaliphatic diisocyanate. The acid polyol can have the structure HO—$(CH_2)n(CR_1R_2)m(CH_2)p$—OH where $R_1$ and $R_2$ are independently H, hydroxyl, an alkyl group, or an acid group; n ranges from 0 to 20; p ranges from 0 to 20; and m ranges from 1 to 20; wherein at least one of $R_1$ and $R_2$ is an acid group.

The polyurethane polymer particles can have various concentrations of the polyols (both in the hard and soft segments), acid polyols, and diisocyanates. Diisocyanate can be present in the polyurethane particles from about 10 wt % to about 70 wt %. The acid polyol can be present in the polyurethane particles from about 1 wt % to about 40 wt %. In further detail, diols can be present from about 1 wt % to about 3 wt %.

In some examples, UV-PUD are water-dispersible acrylic functional polyurethane dispersions. In some other examples, UV-PUD are water-dispersible (meth)acrylated polyurethane dispersions. By water-dispersible (meth)acrylated polyurethane is meant herein a polymer that, when mixed with water, can form a two-phase system of small particles dispersed in water.

Such polyurethane dispersions can be obtained from the reaction of at least one poly-isocyanate compound; optionally, at least one polyol; at least one hydrophilic compound containing, at least, one reactive group capable to react with isocyanate groups and which is capable to render the polyurethane dispersible in aqueous medium either directly or after reaction with a neutralizing agent to provide a salt, and at least one (meth)acrylated compound containing, at least, one reactive group capable to react with isocyanate groups.

Water-dispersible (meth)acrylated polyurethane can be, water-dispersible resins, such as, for examples, compounds commercialized under the name of Ucecoat®6558, Ucecoat®6559, Ebecryl®2002 and Ebecryl®2003 available from Cytec. Such water-dispersible resins can form solution in water when mixed in the appropriate solubility ratio with water, such as, for example solution containing up to 10 wt % of water and 90 wt % of polymer.

In some embodiments, the UV curable polyurethane dispersions (UV-PUD) is an water-dispersible (meth)acrylated polyurethane, sold under the trade name of NeoRad® R441 by NeoResins (Avecia). Other representative but non limiting examples of UV-PUD include Ucecoat®7710, Ucecoat®7655 (available from Cytec), Neorad®R440, Neorad®R441, Neorad®R447, Neorad®R448 (available from DSM NeoResins), Bayhydrol®UV 2317, Bayhydrol®UV VP LS 2348 (available from Bayer), Lux®430, Lux®399, Lux®484 (available from Alberdingk Boley), Laromer®LR8949, Laromer®LR8983, Laromer® PE22WN, Laromer®PE55WN, Laromer®UA9060 (available from BASF).

Hydrophobic Radiation-Curable Monomers

The photo-curable ink composition described herein may include one or more hydrophobic radiation-curable monomers. Subject to desired performance standards, any hydrophobic radiation-curable monomers with sufficient hydrolytic stability or combinations thereof may be incorporated into the ink composition described herein. Accordingly, the ink composition is not limited to specific kinds of hydrophobic radiation-curable monomers in various aspects so long as any such performance conditions are satisfied.

The hydrophobic radiation-curable monomers may be mono-, di-, tri-, tetra- or otherwise multifunctional in terms of radiation-curable moieties. In some examples, the UV curable polyurethane dispersion and the hydrophobic monomers form a non-aqueous phase, in the ink composition that could represent from about 20 wt % to about 50 wt % by total weigh of the ink composition.

The hydrophobic radiation-curable monomers can function as solvents for the photo-initiators, as viscosity modifiers, as binders when cured, and/or as cross-linking agents. The amount of such hydrophobic radiation-curable monomers to be incorporated into the ink can vary within a wide range depending upon the intended use of the resultant composition. The hydrophobic monomer can be present at a level of about 1 to about 15% by weight based on the total weight of the ink composition. In some examples, the hydrophobic monomer is present in an amount representing from about 3 to about 8 wt % based on the total weight of the ink composition. The hydrophobic monomer can be emulsified in the ink composition.

In some examples, the hydrophobic radiation-curable monomers are hydrophobic monofunctional radiation-curable monomers. In some other examples, the hydrophobic radiation-curable monomers are acrylate monomers or vinyl monomers.

The monofunctional hydrophobic radiation-curable monomers can be acrylate monomer. The acrylate monomer can be selected from the group consisting of 2-phenoxyethyl acrylate, isophoryl acrylate, isodecyl acrylate, tridecyl acrylate, lauryl acrylate, 2-(2-ethoxy-ethoxy)ethyl acrylate, tetrahydrofurfuryl acrylate, isobornyl acrylate, propoxylated acrylate, tetrahydrofurfuryl methacrylate, 2-phenoxyethyl methacrylate, isobornyl methacrylate and combinations of two or more thereof. Monofunctional hydrophobic radiation-curable monomers can be vinyl monomers. Vinyl monomer can be selected from the group consisting of vinyl caprolactam, vinyl ether and any combinations thereof. In some examples, hydrophobic radiation-curable monomers used herein are the ones that do not require labeling with Xi or any other danger symbol, like, for example, 2-phenoxyethylacrylate, available from Sartomer under the tradename SR339C.

In some embodiments, hydrophobic radiation-curable monomers are selected from the group consisting of vinyl caprolactams, hexanediol diacrylates, trimethylolpropane triacrylates and propoxylated neopentyl glycol diacrylates. In some other some embodiments, hydrophobic radiation-curable monomers are vinyl caprolactams.

The hydrophobic radiation-curable monomers can be hydrophobic multifunctional radiation-curable monomers. Examples of such higher functional, radiation-curable monomers include hexanediol diacrylate, ethoxylated bisphenol A diacrylate, trimethylolpropane triacrylate, tris(2-hydroxyethyl) isocyanurate triacrylate, combinations of these, and the like. In some examples, multifunctional radiation-curable used herein are the ones that do not require labeling with Xi or any other danger symbol, like propoxylated neopentyl glycol diacrylate, available from Sartomer under the tradename SR 9003.

Photo-Initiator

The photo-curable ink composition described herein include a photo-initiator. The photo-initiator, or UV initiator, is an agent that initiates a reaction upon exposure to a desired wavelength of UV light to cure the ink composition, as described herein, after its application to an ink-receiving material or substrate. In some examples, the photo-initiator is a radical photo-initiator. The photo-initiator may be a single compound or a mixture of two or more compounds. It can be present in the ink composition in an amount sufficient to cure the applied ink composition. In some examples, the photo-initiator is present in an amount representing from about 0.01 to about 10 wt %, or from about 1 to about 5 wt % by weight, based on the total weight of the ink composition.

The photo-initiator can be a water-soluble or a water-dispersible photo-initiator and can be incorporated into the aqueous phase of the ink composition. In some examples, the photo-initiator is a hydrophobic photo-initiator and is incorporated into the hydrophobic radiation-curable monomers. The hydrophobic monomer may be incorporated into the UV-PUD during synthesis and/or to the ink by emulsification. In some other examples, the photo-initiator is dissolved within the hydrophobic radiation-curable monomers. The photo-initiator may be a combination of few photo-initiators, which absorb at different wavelengths.

Examples of radical photo-initiator include, by way of illustration and not limitation, 1-hydroxy-cyclohexylphenylketone, benzophenone, 2,4,6-trimethylbenzo-phenone, 4-methylbenzophenone, diphenyl-(2,4,6-trimethylbenzoyl) phosphine oxide, phenyl bis(2,4,6-trimethylbenzoyl)phosphine oxide, 2-hydroxy-2-methyl-1-phenyl-1-propanone, benzyl-dimethyl ketal, 2-methyl-1-[4-(methylthio)phenyl]-2-morpholinopropan-1-one, or combinations of two or more of the above. Amine synergists may also be used, such as, for example, ethyl-4-dimethylaminobenzoate, 2-ethylhexyl-4-dimethylamino benzoate.

The photo-curable ink composition may include a UV stabilizer, i.e. an agent that can assist with scavenging free radicals. Examples of UV stabilizers include, by way of illustration and not limitation, quinine methide (Irgastab®UV 22 from BASF Corporation) and Genorad®16 (Rahn USA Corporation) and combinations thereof.

In some examples, a photosensitizer may be used with the photo-initiator in amounts ranging from about 0.01 to about 10 wt %, or from about 1 to about 5 wt %, based on the total weight of the ink composition. A photosensitizer absorbs energy and then transfers it to another molecule, usually the photo-initiator. Photosensitizers are often added to shift the light absorption characteristics of a system. Suitable examples of photosensitizers include, but are not limited to thioxanthone, 2-isopropylthioxanthone and 4-isopropylthioxanthone.

Colorant

The photo-curable ink composition described herein may include pigments or dyes as colorants. In some embodiments, the ink compositions include one or more pigments as colorants. Insoluble pigment colorants can assist in achieving a better image performance. The pigments can be self-dispersed pigments, polymer-coated pigments, or common pigments such as milled pigments, for example. A separate dispersing agent may be used to enable appropriate suspension of the pigment in the ink composition. The particulate pigment may be inorganic or organic. The pigment can be of any color including, but not limited to, black, blue, brown, cyan, green, white, violet, magenta, red, orange and yellow, as well as spot colors from mixtures thereof.

Examples of organic pigments that may be present in the photo-curable ink composition include, by way of illustration and not limitation, perylene, phthalocyanine pigments (for example, phthalo green, phthalo blue), cyanine pigments (Cy3, Cy5, and Cy7), naphthalocyanine pigments, nitroso pigments, mono-azo pigments, di-azo pigments, di-azo condensation pigments, basic dye pigments, alkali blue pigments, blue lake pigments, phloxin pigments, quinacridone pigments, iso-indolinone pigments, di-oxazine pigments, carbazole di-oxazine violet pigments, alizarine lake pigments, phthaloxy amine pigments, carmine lake pigments, tetrachloroisoindolinone pigments, perinone pigments, thio-indigo pigments, anthraquinone pigments and quinophthalone pigments, and mixtures of two or more of the above and derivatives of the above. Inorganic pigments that may be present in the ink composition, include, for example, metal oxides (for example, titanium dioxide, electrically conductive titanium dioxide, iron oxides (e.g., red iron oxide, yellow iron oxide, black iron oxide and transparent iron oxides), aluminum oxides, silicon oxides), carbon black pigments (e.g., furnace blacks), metal sulfides, metal chlorides, and mixtures of two or more thereof.

Examples of pigment colorants that may be employed include, by way of illustration and not limitation, yellow pigments having the following Yellow Pigment color index PY 83, PY 151, PY 150, PY 155, PY 139, PY120, PY180, PY 129 and PY 154, PY213. Magenta pigments composed of Red pigment having color indices of PR 202, PR 254, PR 122, PR149, PR185, PR255, PR146 and Violet pigment having color indices of PV 19, PV 23, PV37 and PV 29 may be used. Blue pigments having color indices of PB 15:3, PB 15:4, PB15:2 and PB15:1, as well as black pigments having color indices of PBL Black 7 also may be utilized. Inorganic pigment such as a white pigment of the type $TiO_2$ also may be used. Orange pigment having color indices of PO46, PO64, PO34 as well as green pigments having color index of PG7 also may be employed.

The pigment component can be a dispersible pigment, such as, for example, pigment available under the trade names Paliotol®, Heliogen®, Chromophtal®, Irgalite®, Cinquasia® (available from BASF), Hostaperm®, Novoperm® (available from Clariant), Sunfast®, Quindo® (available from SunChemical), Special Black (available from Degussa), Kronos® (available from Kronos), Kemira® (available from Kemira Pigments).

The amount of pigment in the photo-curable ink composition depends on a number of factors, for example, the nature of the pigment, the nature of the use of the ink composition, the nature of the jetting mechanism for the ink, and the nature of any additives, for example. The ink composition may contain up to 20 wt % of pigment. In some example, the amount of pigment in the photo-curable ink composition is from about 0.1 to about 20 wt %, or from about 1 to about 15 wt %, or from about 5 to about 10 wt %.

Solvent

The photo-curable ink composition described herein may contain an organic solvent. The organic solvent can be soluble (water-soluble) or miscible in water (water-miscible). Such water-soluble soluble or water-miscible solvent can be added to the ink composition while milling pigment concentrate in order to optimize pigment dispersion, color development, and stability. The amount of the organic solvent in the ink composition is dependent on a number of factors such as, for example, optimization of a film forming process, jetting reliability, and maintaining a low VOC content of the ink composition.

When present, the amount of organic solvent in the ink composition is about 0.1 wt % to about 5 wt % by total weight of the ink composition. The nature of the organic solvent is dependent, for example, on the evaporation qualities or volatility of the organic solvent. A single organic solvent may be employed or a combination of two or more organic solvents may be used. In some examples, the organic solvent is a polar organic solvent having carbon atoms and heteroatoms. For example, the organic solvent may have from about 2 to about 50 carbon atoms, or from about 10 to about 30 carbon atoms. The heteroatoms may be in the form of one or more alcohol moieties, ether moieties, ketone moieties, aldehyde moieties, amine moieties, and amide moieties, for example. The organic solvent may have a boiling point of about 170° C. to about 250° C., or about 190° C. to about 220° C., for example.

The organic solvent can be, by way of illustration and not limitation, an alcohol; a polyhydric alcohol; a glycol derivative such as, e.g., an ether or an ester; an amine; an amide; and other organic solvents such as, for example, dimethylsulfoxide, sulfolane, 2-pyrrolidone, 2-oxazolidone, 1,3-dimethyl-2-imidizolidinone. The above-mentioned organic solvents can be used in combination of two or more thereof. In some examples, the organic solvent is a glycol, a glycol ether, an alcohol, or a heterocyclic ketone, or a combination of two or more of the above. Some examples of particular organic solvents include, by way of illustration and not limitation, glycol ether solvents, for example, tri-propylene glycol monomethyl ether (Dowanol®TPM), dipropylene glycol ether (Dowanol®DPG), dipropylene glycol dimethyl ether (Proglyde®DMM) (all available from Dow Chemical Company, Midland Mich.), for example.

Other Components and Additives

Other components and additives may be present in the photo-curable ink composition in order to improve ink properties and performances. The additives include, but are not limited to, one or more of surfactants, dispersing agents, rheology modifiers, biocides, anti-foaming agents, and UV stabilizers. In some examples, the photo-curable ink composition of the present disclosure further contains one or more additives selected from the group consisting of surfactant, dispersing agent, UV stabilizer, de-foaming agent, rheology modifiers and biocides. The total amount by weight of additives in the ink composition is, for example, from about 0.1 to about 1 wt % or, from about 0.2 to about 0.5 wt %.

Surfactants include, for example, those commercially available under the brand names: WET® and GLIDE® (from Evonik Tego Chemie GmbH, Essen, Germany); BYK® (from BYK Chemie GmbH, Wesel, Germany); Dynax®(from Dynax Corp. Pound Ridge N.Y.); 3M Novec® (from 3M Energy and Advanced Materials, St. Paul Minn.); and Zonyl® FSO (from DuPont de Nemours Company, Wilmington Del.).

Examples of anti-foaming agents are those commercially available under the brand names: Foamex® and Twin® (from Evonik Tego Chemie Service GmbH); BYK® (from BYK Chemie GmbH); and Surfynol® (from Air Products and Chemicals, Inc.).

Examples of dispersants include high molecular weight copolymers with groups having an affinity for a pigment. Specific examples of dispersants include those commercially available from BYK Chemie GmbH under the brand names BYK®.

Examples of rheology modifiers include those commercially available under the brand names: Acrysol® (from Rohm & Haas); Borchigel® (from OMG Borchers GmbH, Langenfield, Germany); BYK® (from BYK Chemie GmbH); and DSX® (from Cognis GmbH, Monheim am Rhein, Germany)

Method for Forming a Printed Article and Printing System

In some embodiments, a method for forming a printed article includes providing a photo-curable ink composition containing UV curable polyurethane dispersions, water, photo-initiator, colorant and hydrophobic radiation-curable monomers; providing a media substrate; projecting (or jetting) of stream of droplets of said photo-curable ink composition onto the media substrate; and applying photo energy to the ink composition once printed on the media substrate, said photo energy having a frequency and energy level suitable for curing the photo-curable ink composition.

In some examples, the projection of stream of droplets of ink composition, onto the media substrate, is done via inkjet printing techniques. The ink composition may be established on the material via any suitable printing techniques, such techniques include thermal, acoustic, continuous and piezoelectric inkjet printing. In inkjet printing devices, liquid ink drops are applied in a controlled fashion to an ink-receiving substrate, or media substrate, by ejecting ink droplets from a plurality of nozzles, or orifices, in a printhead of an inkjet printing device or inkjet printer. In drop-on-demand systems, a droplet of ink is ejected from an orifice directly to a position on the surface of an ink-receiving substrate, or media substrate, by pressure created by, for example, a piezoelectric device, an acoustic device, or a thermal process controlled in accordance digital data signals. For inkjet printing, the ink composition can be heated or chilled to an appropriate dispensation temperature, prior to ejecting the ink composition to the surface of a substrate. In some examples, the projection of stream of droplets of ink composition, onto the media substrate, is done via a piezoelectric printhead.

For inkjet printing, the ink composition is heated or chilled to an appropriate dispensation temperature prior to ejecting the ink composition to the surface of a substrate. The particular temperature and viscosity of the ink composition is dependent on, for example, the particular method and equipment for conducting the inkjet printing. Considerations regarding temperature and viscosity of the ink composition relate to the effect on droplet size and droplet ejecting rate, for example. In some examples, the temperature is maintained relatively constant, which means that the temperature variation is controlled so that there is no more than a variation of $\pm 1°$ C., or $\pm 0.5°$ C., or $\pm 0.2°$ C., or $\pm 0.1°$ C., for example. Temperature control is achieved with appropriate temperature sensors, for example.

The present printed or jetted ink may be dried after jetting the ink composition in a predetermined pattern onto the substrate in view of evaporating the water content of the ink. The drying stage may be conducted, by way of illustration and not limitation, by hot air, electrical heater or light irradiation (e.g., IR lamps), or a combination of such drying methods. In order to achieve a targeted performance level, it is advisable to dry the ink at a maximum temperature allowable by the substrate that enables good image quality without substrate deformation. The temperature used for drying should be selected taking into consideration that fact that various plastic substrate materials tend to bend and deform at elevated temperatures. Consequently, the substrate deformation temperature should not be exceeded while drying. Examples of a temperature during drying is from about 40° C. to about 150° C., or about 50° C. to about 80° C., for example. The ink composition according to the principles herein enables printing on plastic materials while drying at relatively low temperatures of about 40° C. to about 70° C., or about 50° C. to about 60° C., for example, and while achieving fast drying time and good image quality.

In some embodiment, the printed or jetted ink composition is cured by applying photo energy to the ink composition, said photo energy having a frequency and energy level suitable for curing the ink composition. In such curing step, a mercury or similar lamp can be used in order to fully cure and cross link the ink composition to the media substrate. For applying photo energy, the photo-curable ink composition, on the media substrate, may be subjected to suitable light sources for curing the ink compositions in accordance with the principles described herein. Ultraviolet (UV) radiations can be used to cure the ink composition as described above. Curing radiation can be UV radiation radiated by UV lamps, blue lasers, UV lasers, or ultraviolet LEDs, for example. The curing radiation may be provided by a source of ultraviolet radiation operating in a continuous mode. The curing radiation may also be provided by a source of ultraviolet operating in a flash or pulsed mode. In some examples, the ink composition is cured by using, for example, a wide arc mercury lamp, in order to fully cure and crosslink the ink.

In accordance with the principles described herein, the photo-curable ink compositions find uses as ink compositions for inkjet printers. In some examples, the photo-curable ink compositions may be dispensed to the surface of a broad range of substrates employing inkjet technology and equipment. A suitable inkjet printer, according to the present method, is an apparatus configured to perform the printing and ink curing processes. The printer may be a single pass inkjet printer or a multi-pass inkjet printer. The printer may include a temperature stabilization module operative to ensure maintenance of the range of ink jetting temperatures.

In some examples, the photo-curable ink composition is applied on a pre-treated media surface. An ink-receiver layer may be applied to certain substrates in a pre-treatment stage prior to jetting the image in order to get the required image quality. The ink-receiving layer may be applied in a pre-treatment stage digitally by applying the ink-receiver layer with piezoelectric printheads, or the ink-receiving layer may be applied in the pre-treatment stage by analog methods such as spray gun or roller coater, for example. The ink receiver layer can serve as a fixer for the ink composition dispensed to the surface of a substrate in part preventing movement of ink droplets on the substrate, where the movement may result in negative image quality effects.

As mentioned, the photo-curable ink composition is jetted onto a media substrate. The media substrate may be planar, either smooth or rough, or have any other shape that is suitable for the particular purpose for which it is employed. The media substrate can have a thickness in the range of about 0.1 mm to about 10 mm or in the range of about 1 mm to about 5 mm. The media substrate may be porous or non-porous, rigid, semi-rigid, or flexible, for example. Planar media substrates may be in the form, for example, of a film, plate, board, or sheet by way of illustration and not limitation.

Examples of media substrate include, but are not limited to, plastic substrates (for example, polyethylene terephthalate, polyethylene, polystyrene, polypropylene, polycarbonate, and acrylic), paper, paper laminated with plastic (for example, polyethylene, polypropylene, or polystyrene), cardboard, paperboard, foam board, and textiles. The media can also be rigid PVC (polyvinylchloride rigid substrate) or PETG (Polyethylene Terephthalate Glycol-modified). In some examples, the media substrate is non-porous and has low surface tension. Non-limiting examples include plastics, PVC, banner paper, and polypropylenes, and synthetic paper, such as Yupo® synthetic paper. Banner paper is specifically configured for printing banners, has a smooth surface, and is often designed for color printing. The term "non-porous" includes surfaces that can have relatively poor water permeability, absorption, and/or adsorption. Vinyl and other plastic sheets or films, metals, coated offset media, glass, and other similar substrates are considered non-porous. In some embodiments, the media substrate can be a plastic substrate. In some other embodiments, the media substrate is a rigid plastic substrate. In some examples, the media substrate is a polypropylene, a polyvinyl chloride (PVC), an acrylic or a polycarbonate substrate. In some other examples, the media substrate is a polyvinyl chloride (PVC) or a polycarbonate substrate. The media substrates can be non-swellable and/or are non-polar. By non-swellable, it is meant herein that the substrate surface is not swelled by any components of the ink, and no chemical bonds are formed between ink and substrate. By non-polar, it is meant herein that the substrate surface is charge-neutral, therefore adhesion to it is difficult to achieve.

In some embodiments, the present disclosure refers to an inkjet printing system that include a media substrate; at least one photo-curable ink composition containing UV curable polyurethane dispersions, water, photo-initiator, colorant and hydrophobic radiation-curable monomers; and a photo energy source configured to apply photo energy to said ink composition once printed on a substrate, said photo energy having a frequency and energy level suitable for curing the photo-curable ink composition. In some examples, the photo energy source is a UV light source having a frequency and energy level suitable for curing the ink composition.

In some other embodiments, the present disclosure refers to method for preparing the above mentioned photo-curable ink composition. The method includes providing, in combination, photo-curable ink composition containing UV curable polyurethane dispersions (UV-PUD), water, photo-initiator, colorant and hydrophobic radiation-curable monomers; subjecting the combination to conditions under which the ink composition becomes substantially uniform and have viscosity and surface tension suitable for jetting; and subjecting the combination to filtration. In some examples, conditions for rendering the ink composition to a substantially uniform dispersion include, for example, agitation such as, e.g., one or more of mixing, stirring, shaking, homogenizing, sonication, ultra-sonication, micro-fluidization, bead milling, and blending, for example, or a combination of the above. In some examples the temperature during the above procedure may be, for example, from about 10° C. to about 40° C., or from about 20° C. to about 30° C. In some examples, the temperature is ambient temperature. The phrase "substantially uniform" means that there is no visible phase separation and that the ink composition applied by draw down results in a uniform film without visible defects such as de-wetting, clustering, or air bubbles, for example. The ink composition may be filtered to remove large particles that may prohibit reliable jetting. Filtration may be carried out using, by way of illustration and not limitation, one or more of membrane filtration, surface filtration, depth filtration, screen filtration, and filtration aid, for example.

EXAMPLES

1—List of Ingredients

TABLE (a)

| Ingredients name | Supplier | Ingredient type |
| --- | --- | --- |
| Neorad ®R441 [aliphatic acrylated Urethane dispersion] | DSM | UV-PUD |

TABLE (a)-continued

| Ingredients name | Supplier | Ingredient type |
| --- | --- | --- |
| Irgacure ®819 [Bis(2,4,6-trimethylbenzoyl)-phenyl-phosphineoxide] | BASF | Photo-initiator |
| Irgacure ® 2959 [(2-Hydroxyeth-oxy)phenyl-2hydroxy-2methyl-1propane] | BASF | Photo-initiator |
| Omnirad ® ITX [2-isopropyl thioxanthone] | IGM | Photo-initiator |
| N-vinylcaprolactam | BASF | Hydrophobic monomer |
| SR285 ® [tetra-hydrofurfuryl acrylate] | Sartomer | Hydrophobic monomer |
| Hostafine ®Blue B2G | Clariant | Pigment preparation |
| Byk 348 ® | Byk Chemie | Surfactant |

2—Testing Procedures

Procedure for Testing Viscosity:

The viscosity of the ink compositions is determined using a HAAKE RS-600 rheometer (Thermo Electron, Newington N.H.) and a TCP/P Peltier controlled unit (Thermo Electron). The viscosity is measured at a temperature of 25° C. and the results are recorded at a shear rate of 4000 l/sec.

Procedure for Testing Curing Speed:

The curing speed of samples of ink compositions are determined using LC6B bench top conveyer with Light Hammer 6 UV curing system (Fusion UV systems Inc., Gaithersburg Md.). The ink samples are applied to a substrate by means of a draw down using a K Control Coater (RK Print Coat Instruments Ltd, Litlington, UK) in a thickness of 12 microns (μm). The samples are dried under hot air flow at a temperature of about 50° C. for 1 minute. After drying, the ink is irradiated once under the UV lamp at various conveyer speeds. The cured ink film is tested with a S.A.M Hoffman Tester fitted with Gradco/Hoffman cutter. (The "blade" of the Hoffman instrument is made of hardened tool steel formed into a cylindrical shape, with the axis of the cylinder held at 45 degrees by a beam carrying a sliding weight. The beam is attached through a hinge arrangement to a small four wheel trolley. Sufficient downward force on the trolley lifts the weight which imposes a force on the cutter against the test specimen in proportion to the positioning of the weight on the beam. The trolley is then pulled across the test sample and the effect, if any, of the "blade" is observed.) The Hoffman Tester is used in the lower range of up to 250 grams loading. The purpose of the test is to determine the maximum weight that can be used with the Tester without scratching the specimen at a given curing speed of the LC6B conveyer. The degree of curing at a certain conveyer speed is directly proportional to the maximum weight. The higher the supported weight is, the better the results are.

Adhesion Testing Procedure:

Adhesion testing is performed according to ASTM 3359 "Measuring Adhesion by Tape Test". Cuts are made to the printed sample by a cross hatch cutter such as Elcometer®1542 Cross Hatch Adhesion Tester (Elcometer Inc., Rochester Hills, Mich.). Adhesive tape (3M Scotch® tape 250), is placed and smoothed over the cut area. The tape is then removed rapidly in one movement and the cut area is inspected. The results are reported according to the removal of ink from the substrate. A score is provided within the range 0-5 (a score of 5 illustrates excellent adhesion performances and a score of 0 illustrates very poor adhesion performances).

3—Ink Composition Formulations

Different water-based photo-curable ink compositions are prepared Ink formulation #1 is in accordance with embodiments of the present disclosure Ink formulation #2 is a comparative ink composition. All ink formulations are illustrated in the TABLE (b) below. All percentages are expressed in wt % of the total composition.

Ink formulation #1 is prepared by mixing in two different parts: Part A (hydrophobic phase) and Part B (water-phase). Part A contains N-vinylcaprolactam, SR285, Irgacure®819 and Omnirad®ITX. The components of Part A are mixed for about 30 minutes with a Dispermat® mixer (available from Byk) until a uniform solution is achieved. Part B contains of Neorad®R441 and Water. Part A is then mixed into Part B by a Dispermat® mixer for about 1 hour until a uniform dispersion is achieved, after which a pigment preparation and surfactants are added and mixed for additional 15 minutes. The ink is then filtered through a 1.2 micron absolute membrane filter. A Haake®RS-600 rheometer (Thermo Electron, Newington N.H.) is used to measure ink viscosity, which is about 3 cps at 20° C. Ink surface tension, as measured by a Lauda® tensiometer (LAUDA Brinkmann LP, Delran N.J.) is about 30 dyne/cm at room temperature.

Ink formulation #2 is a comparative ink formula that does not contain hydrophobic monomers. Neorad®R441, Irgacure 2959 and water are mixed in a Dispermat® mixer for 1 hour until a uniform dispersion is achieved, after which a pigment preparation and surfactants are added and mixed for additional 15 min. The ink is then filtered through a 1.2 micron absolute membrane filter. A Haake® RS-600 rheometer is used to measure ink viscosity, which is about 2.5 cps at 20° C. Ink surface tension as measured by a LAUDA® tensiometer is about 30 dyne/cm at room temperature.

TABLE (b)

| Ingredients name | Ink # 1 | Ink # 2 |
|---|---|---|
| Water | 46.3% | 53.05% |
| Neorad ® R441 | 42.5% | 42.5% |
| N-vinylcaprolactam | 3.45% | — |
| SR285 ® | 3.45% | — |
| Irgacure ® 819 | 0.45% | — |
| Irgacure ® 2959 | — | 0.75% |
| Omnirad ®ITX | 0.15% | — |
| Hostafine ® blue B2G | 3.4% | 3.4% |
| Byk ®348 | 0.3% | 0.3% |

4—Ink Composition Performances

Curing Speed Performances:

The curing speed of Ink formulation #1 and #2 are tested according to the procedure described above, at conveyer speeds of 0.5 m/s and 1 m/s, on rigid PVC and Polycarbonate substrates sheets (Available from PALRAM Industries Ltd). The results are illustrated in the table (c) below.

Adhesion Performances:

The adhesion of ink formulations #1 and #2 are tested on PVC and on Polycarbonate sheets, according to the procedure described above, at conveyer speeds of 0.5 m/s and 1 m/s. The ink formulation #1 passes the test on PVC without any removal and with a maximum score of 5 at 0.5 m/s and 1 m/s conveyer speeds Ink formulation #1 passes the test on polycarbonate with minimal removal and with a score of 4 at 1 m/s and without any removal and with a maximum score of 5 at 0.5 m/s. The ink formulation #2 fails the test on PVC with more than 65% removal, with a score of 0 at 1 m/s and with a score of 2 at 0.5 m/s conveyer speeds. The Ink formulation #2 fails the test on Polycarbonate with more than 65% removal and with a score of 0 at 1 m/s and 0.5 m/s. Detailed results are summarized in the table (c) below.

TABLE (c)

| Measurement and performances | Ink # 1 | Ink # 2 |
|---|---|---|
| Ink viscosity (cps) at 20° C. | 3 | 2.5 |
| Ink surface tension (dyne/cm) at 20° C. | 30 | 30 |
| Curing speed max. weight supported | | |
| PVC at 0.5 m/s & 1 m/s conveyer speeds | 250 grams | 100 grams |
| Polycarbonate at 0.5 m/s conveyer speeds | 250 grams | 75 grams |
| Polycarbonate at 1 m/s conveyer speeds | 180 grams | 50 grams |
| Adhesion score | | |
| on PVC at 0.5 m/s conveyer speeds | 5 | 2 |
| on PVC at 1 m/s conveyer speeds | 5 | 0 |
| Polycarbonate at 0.5 m/s conveyer speeds | 5 | 0 |
| Polycarbonate at 1 m/s conveyer speeds | 4 | 0 |

These results demonstrate that ink formulations according to the present disclosure have improved mechanical film properties (adhesion performances) and excellent curing speed properties. These results also demonstrate that that ink formulations according to the present disclosure improve ink adhesion to untreated plastics. Indeed, the ink formulation #1, which contains hydrophobic monomers and UV-PUD, shows superior curing and adhesion properties compared to the ink formulation #2 that contains the same amount of UV-PUD but without any hydrophobic monomers.

The invention claimed is:

1. A photo-curable ink composition, comprising:
    colorant, water, photo-initiator, UV curable polyurethane dispersions and hydrophobic radiation-curable monomers;
    wherein the UV curable polyurethane dispersions and the hydrophobic radiation-curable monomers form a non-aqueous phase in the ink composition, the non-aqueous phase in the ink composition representing from about 20 wt % to about 50 wt % of the total weight of the ink composition.

2. The photo-curable ink composition of claim 1 wherein the UV curable polyurethane dispersions are present in an amount representing from about 1 wt % to about 25 wt % of the total weight of the ink composition.

3. The photo-curable ink composition of claim 1 wherein the UV curable polyurethane dispersions are water-dispersible (meth)acrylated polyurethane.

4. The photo-curable ink composition of claim 1 wherein the hydrophobic radiation-curable monomers are acrylate monomers or vinyl monomers.

5. The photo-curable ink composition of claim 1 wherein the hydrophobic radiation-curable monomers are selected from the group consisting of vinyl caprolactam, hexanediol diacrylate, trimethylolpropane triacrylate and propoxylated neopentyl glycol diacrylate.

6. The photo-curable ink composition of claim 1, wherein the composition contains water in an amount ranging from about 10 wt % to about 80 wt % by total weight of the ink composition.

7. The photo-curable ink composition of claim 1, wherein the ink composition further contains a water-soluble or water-miscible organic solvent.

8. The photo-curable ink composition of claim 1, wherein the ink composition further contains one or more additives selected from the group consisting of surfactant, dispersing agent, UV stabilizer, de-foaming agent, rheology modifiers and biocides.

9. A photo-curable ink composition, comprising:
colorant, water, photo-initiator, UV curable polyurethane dispersions and hydrophobic radiation-curable monomers;
wherein the UV curable polyurethane dispersions and the hydrophobic radiation-curable monomers form a non-aqueous phase in the ink composition, and the hydrophobic radiation-curable monomers are vinyl caprolactam.

10. A method for forming a printed article, comprising:
providing a photo-curable ink composition containing water, colorant, photo-initiator, UV curable polyurethane dispersions and hydrophobic radiation-curable monomers, wherein the UV curable polyurethane dispersions and the hydrophobic radiation-curable monomers form a non-aqueous phase in the ink composition, the non-aqueous phase in the ink composition representing from about 20 wt % to about 50 wt % of the total weight of the ink composition;
providing a media substrate;
projecting of stream of droplets of said photo-curable ink composition onto the media substrate; and
applying photo energy to the ink composition once printed on the media substrate, said photo energy having a frequency and energy level suitable for curing the photo-curable ink composition.

11. The method for forming a printed article of claim 10, wherein the projection of stream of droplets of ink composition, onto the media substrate, is done via a piezoelectric printhead.

12. An inkjet printing system, comprising:
a media substrate;
at least one photo-curable ink composition comprising colorant, water, photo-initiator, UV curable polyurethane dispersions and hydrophobic radiation-curable monomers, wherein the UV curable polyurethane dispersions and the hydrophobic radiation-curable monomers form a non-aqueous phase in the ink composition, the non-aqueous phase in the ink composition representing from about 20 wt % to about 50 wt % of the total weight of the ink composition; and
a photo energy source configured to apply photo energy to said ink composition once printed on a substrate, said photo energy having a frequency and energy level suitable for curing the photo-curable ink composition.

13. The inkjet printing system of claim 12, wherein the photo energy source is a UV light source.

14. A method for preparing photo-curable ink composition, comprising:
providing in combination colorant, water, photo-initiator, UV curable polyurethane dispersions and hydrophobic radiation-curable monomers;
subjecting the combination to conditions under which the ink composition becomes substantially uniform, thereby forming from the UV curable polyurethane dispersions and the hydrophobic radiation-curable monomers a non-aqueous phase in the ink; and
subjecting the combination to filtration.

* * * * *